Patented Oct. 17, 1933

1,930,653

UNITED STATES PATENT OFFICE 1,930,653

PRIMING MIXTURE

Joseph D. McNutt, New Haven, Conn., assignor to Winchester Repeating Arms Company, New Haven, Conn., a corporation of Maryland No Drawing. Application March 10, 1933
Serial No. 660,236

21 Claims. (Cl. 52—2)

This invention relates to priming mixtures for small arms ammunition and more particularly to a non-mercuric priming mixture.

Heretofore mercury fulminate has been generally used as the initiator in priming mixtures for small arms ammunition. It possesses many advantages and it has been difficult to find other materials to be used in place of mercury fulminate which would produce as satisfactory results, even though considerable effort has been made to eliminate mercury fulminate from priming mixtures. While it possesses certain advantages, it also possesses certain disadvantages. Amalgamation of the cartridge cases caused by the free mercury produced by the decomposition of the mercury fulminate when the cartridge is exploded prevents reloading of center fire cartridges. By employing a priming mixture in which no mercury fulminate is present, this amalgamation is limited and this permits reloading and reuse of center fire cartridge cases. The priming mixture of my invention also possesses advantages for use in rim fire primers. It has greater stability on storing and therefore permits the ammunition to be used and better results obtained after it has been stored for long periods of time.

In the present invention I employ a salt of tetrazene. The term "tetrazene" is used in the ammunition industry to designate a material that is also designated by the term "guanylnitrosoamino-guanyltetrazene" although it must be recognized that tetrazene is the genus of which the alleged synonym is but one of a score of species. I am aware that it has been proposed to employ tetrazole derivatives and salts of tetrazole derivatives in the manufacture of priming mixtures for small arms ammunition. It has also been proposed to employ tetrazene as an ingredient of a priming mixture. The invention forming the subject matter of the present application differs from these prior proposals in that I employ a metallic salt of tetrazene, preferably a salt of a heavy metal. The tetrazene salts which I have found particularly useful are the silver salt of tetrazene and the cuprous salt of tetrazene. I preferably employ a salt of tetrazene in combination with lead dinitrophenylazide. These materials may be used in the following proportions with the usual oxidizing, reducing and abrasive agents in the manufacture of priming mixtures in the manner well known to those skilled in the art.

The heavy metal salts of tetrazene may be prepared by substantially following the method disclosed by Leihig: Annalen der Chemie (1911), Vol. 380, pp. 138, 139, 140, for the preparation of a silver salt of tetrazene. A specific example of my method of preparing a silver salt of tetrazene is as follows:

70 grams of tetrazene is dissolved in 100 cc. of 38% nitric acid maintaining a temperature between 40 and 50° C. To this is added 130 grams silver nitrate dissolved in 250 cc. of water, the solution being thoroughly agitated until the precipitation of the silver salt of tetrazene is complete. During the addition of the silver nitrate solution the temperature is kept also between 40 and 50° C. The precipitate is thoroughly washed and dried and is then ready for use.

The silver salt of tetrazene referred to above is the double salt and has the formula—
$AgC_2H_7ON_{10}.AgNO_3.3H_2O$.

In the preparation of a cuprous salt of tetrazene substantially the same method is followed, cuprous chloride being substituted for silver nitrate and the proportions being followed to obtain the proper amount of copper for combination with the tetrazene.

Lead dinitrophenylazide may be prepared by dissolving 100 grams of diazodinitrophenol in 1200 cc. of acetone. To this solution I then add a solution consisting of 30 grams of sodium azide dissolved in 300 cc. of water. The heat of the solution should be maintained below 50° C. The addition of the sodium azide solution causes a reaction resulting in the formation of sodium dinitrophenylazide. I then add 90 grams of lead nitrate dissolved in 900 cc. of water. The solution is then cooled to 15° C. and lead dinitrophenylazide is precipitated. The precipitate is washed with water and alcohol until it is free of lead nitrate. The formula for the material lead dinitrophenylazide is $PbC_{12}N_{10}O_{10}$.

The reactions which occur are represented by the following structural equations:

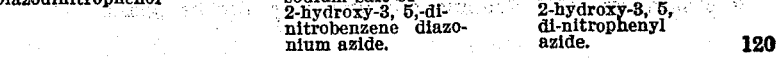

| Diazodinitrophenol | sodium salt of 2-hydroxy-3, 5,-dinitrobenzene diazonium azide. | sodium salt of 2-hydroxy-3, 5, di-nitrophenyl azide. |

Normal lead salt of 2-hydroxy-3, 5, -dinitrophenylazide: prepared containing salts of tetrazene and lead azide. Thus a rim fire mixture may consist of the following ingredients in substantially the following proportions:

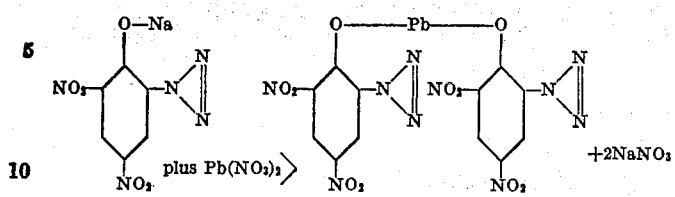

A suitable priming mixture for center fire cartridges may be formed by mixing the following ingredients in substantially the following proportions:—

Lead Dinitrophenylazide _____ 15 to 20%, preferably 17%
Silver Salt of Tetrazene _____ 7 to 12%, preferably 10%
Barium Nitrate _____ 17 to 35%, preferably 27%
Lead Peroxide _____ 10 to 25%, preferably 17%
Antimony Sulphide __ 15 to 25%, preferably 22%
Calcium Silicide _____ 0 to 10%, preferably 7%

The proportions of these ingredients may, of course, be varied depending upon the commercial strength of the ingredients and to meet the requirements of various uses of the mixture.

The ingredients are first thoroughly and homogeneously mixed and then poured into individual pellets of the proper size for the individual charges in the customary way, by means of a charge plate provided with perforations adapted to mold pellets of the proper size. These pellets are then loaded into primer cups in the usual way and the primer cups then assembled in the cartridge cases.

These materials may also be employed in rim fire mixtures. A suitable priming mixture for rim fire use may be formed by mixing the following ingredients in the following proportions:--

Lead Dinitrophenylazide_____ 15 to 25%, preferably 20%
Silver Salt of Tetrazene_____ 15 to 25%, preferably 20%
Lead Dinitroxybenzoic Acid PbC₇H₂N₂O₇ 8 to 15%, preferably 12%
Barium Nitrate_____ 15 to 25%, preferably 18%
Lead Peroxide_____ 5 to 10%, preferably 8%
Ground Glass_____ 20 to 25%, preferably 22%

The structural formula for lead dinitro-oxybenzoic acid is as follows:

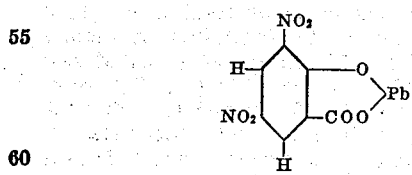

As in the center fire mixtures the proportions of the ingredients may be varied depending upon the properties desired in the individual case and the commercial strength of the ingredients. The rim fire mixture is prepared in the usual way, poured into individual pellets of the proper size for the individual charges by means of a charge plate in the usual manner and then transferred to empty rim fire cartridge shells. The priming mixture is then forced to distribute itself into the hollow rim of the cartridge shell by spinning the shell in the customary machine. The shells are then loaded with powder and bullets in the customary way. Priming mixtures may also be prepared containing salts of tetrazene and lead azide. Thus a rim fire mixture may consist of the following ingredients in substantially the following proportions:

Lead Azide _____15 to 25%, preferably 23%
Glass _____15 to 25%, preferably 21%
Lead Peroxide _____6 to 10%, preferably 8%
Calcium Silicide _____12 to 20%, preferably 16%
Silver Salt of Tetrazene _____3 to 10%, preferably 7%
Barium Nitrate _____18 to 30%, preferably 22%
Gum _____2 to 4%, preferably 3%

Likewise, a center fire mixture may be formed of the following ingredients in substantially the following proportions:

Lead Azide _____12 to 20%, preferably 16%
Lead Peroxide _____12 to 20%, preferably 15%
Calcium Silicide _____12 to 20%, preferably 15%
Silver Salt of Tetrazene _____2 to 10%, preferably 5%
Barium Nitrate _____28 to 35%, preferably 32%
Gum _____2 to 4%, preferably 3%
Antimony Sulphide_____10 to 18%, preferably 14%

This application is a continuation in part of my copending application Serial No. 636,681, filed October 7, 1932.

I claim:

1. A priming mixture comprising a heavy metal salt of tetrazene.

2. A priming mixture comprising silver salt of tetrazene.

3. A priming mixture comprising cuprous salt of tetrazene.

4. A priming mixture comprising a heavy metal salt of tetrazene and lead dinitrophenylazide.

5. A priming mixture comprising silver salt of tetrazene and lead dinitrophenylazide.

6. A priming mixture comprising cuprous salt of tetrazene and lead dinitrophenylazide.

7. A priming mixture comprising silver salt of tetrazene, lead dinitrophenylazide, an oxidizing agent and a fuel.

8. A priming mixture comprising cuprous salt of tetrazene, lead dinitrophenylazide, an oxidizing agent and a fuel.

9. A priming mixture comprising from 15 to 20 percent lead dinitrophenylazide, 7 to 12 percent silver salt of tetrazene, 17 to 35 percent barium nitrate, 10 to 25 percent lead peroxide, 15 to 25 percent antimony sulphide, and 0 to 10 percent calcium silicide.

10. A priming mixture comprising substantially 17 percent lead dinitrophenylazide, substantially percent silver salt of tetrazene, substantially 27 percent barium nitrate, substantially 17 percent lead peroxide, substantially 22 percent antimony sulphide and substantially 7 percent calcium silicide.

11. A priming mixture comprising from 15 to 25 percent lead dinitrophenylazide, 15 to 25 percent silver salt of tetrazene, 8 to 15 percent lead dinitrooxybenzoic acid, 15 to 25 percent barium nitrate, 5 to 10 percent lead peroxide and 20 to 25 percent ground glass.

12. A priming mixture comprising substantially 20 percent lead dinitrophenylazide, substantially 20 percent silver salt of tetrazene, substantially 12 percent lead dinitrooxybenzoic acid, substantially 18 percent barium nitrate, substantially 8 percent lead peroxide and substantially 22 percent ground glass, 13. A priming mixture comprising a heavy metal salt of tetrazene and lead azide.

14. A priming mixture comprising a silver salt of tetrazene and lead azide.

15. A priming mixture comprising a cuprous salt of tetrazene and lead azide.

16. A priming mixture comprising a silver salt of tetrazene, lead azide, and oxidizing agent and a fuel.

17. A priming mixture comprising a cuprous salt of tetrazene, lead azide, and oxidizing agent and a fuel.

18. A priming mixture comprising from 15 to 25 percent lead azide, 18 to 25 percent glass, 6 to 10 percent lead peroxide, 12 to 20 percent calcium silicide, 3 to 10 percent silver salt of tetrazene, 18 to 30 percent barium nitrate and 2 to 4 percent gum.

19. A priming mixture comprising substantially 23 percent lead azide, substantially 21 percent glass, substantially 6 percent lead peroxide, substantially 16 percent calcium silicide, substantially 7 percent silver salt of tetrazene, substantially 22 percent barium nitrate and substantially 3 percent gum.

20. A priming mixture comprising from 12 to 20 per cent lead azide, 12 to 20 percent lead peroxide, 12 to 20 percent calcium silicide, 2 to 10 percent silver salt of tetrazene, 28 to 35 percent barium nitrate, 2 to 4 percent gum and 10 to 18 percent antimony sulphide.

21. A priming mixture comprising substantially 16 percent lead azide, substantially 15 percent lead peroxide, substantially 15 percent calcium silicide, substantially 5 percent silver salt of tetrazene, substantially 32 percent barium nitrate, substantially 3 percent gum and substantially 14 percent antimony sulphide.

JOSEPH D. McNUTT.

CERTIFICATE OF CORRECTION.

Patent No. 1,930,653.              October 17, 1933.

JOSEPH D. McNUTT.

It is hereby certified that error appears in the printed specification of the above numbered patent requiring correction as follows: Page 2, line 132, claim 10, after "substantially" insert the number 10; and that the said Letters Patent should be read with this correction therein that the same may conform to the record of the case in the Patent Office.

Signed and sealed this 28th day of November, A. D. 1933.

F. M. Hopkins

Acting Commissioner of Patents.

(Seal)